United States Patent
Daugherty

[11] 3,902,771
[45] Sept. 2, 1975

[54] RUBBER STAVE BEARING WHICH WILL PERMIT SLOW SPEED MOTION WITHOUT STICK-SLIP AND RESULTANT SQUEAL

[75] Inventor: Thomas L. Daugherty, Arnold, Md.

[73] Assignee: The United States of America as represented by the Secretary of the Navy, Washington, D.C.

[22] Filed: Mar. 26, 1974

[21] Appl. No.: 454,882

[52] U.S. Cl. ............................................. 308/36.1
[51] Int. Cl.² ...................... F16C 1/24; F16C 33/72
[58] Field of Search ............ 308/36, 36.1, 36.2, 72, 308/92, DIG. 12, 121

[56] References Cited
UNITED STATES PATENTS

| | | | |
|---|---|---|---|
| 1,942,194 | 1/1934 | Wallgren | 308/36 |
| 3,215,477 | 11/1965 | Arthur | 308/36.1 |
| 3,330,605 | 7/1967 | Jasmand | 308/36.1 |
| 3,359,048 | 12/1967 | Lowe | 308/36.2 |
| 3,762,359 | 10/1973 | Jones, Jr. | 308/36.1 |

*Primary Examiner*—Lloyd L. King
*Attorney, Agent, or Firm*—R. S. Sciascia; Q. E. Hodges

[57] ABSTRACT

A bearing assembly for preventing "stick-slip" phenomenon due to shaft rotation. A rotatable metal shell is placed between the shaft and an outer set of stave bearings which are attached to an outer stationary housing. An inner set of rubber staves connected to the rotatable metal shell separates the rotatable shell from the shaft. The metal shell is rotated in the opposite direction of shaft rotation or in the same direction but at a faster rotational speed by mechanical means or by electromagnetic means to obtain the hydrodynamic film necessary for silent operation.

5 Claims, 8 Drawing Figures

3,902,771
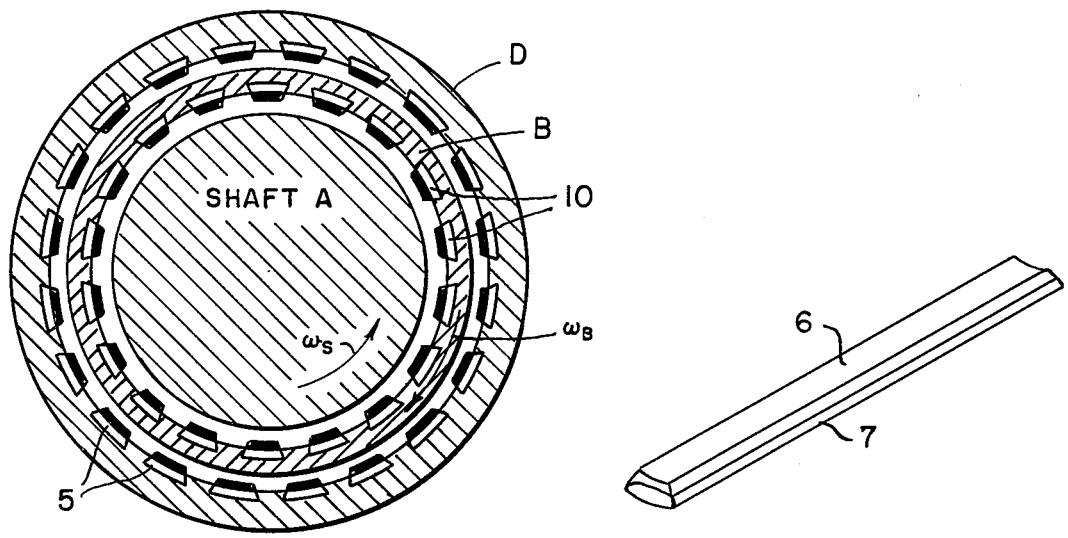
FIG. 1.
FIG. 2.
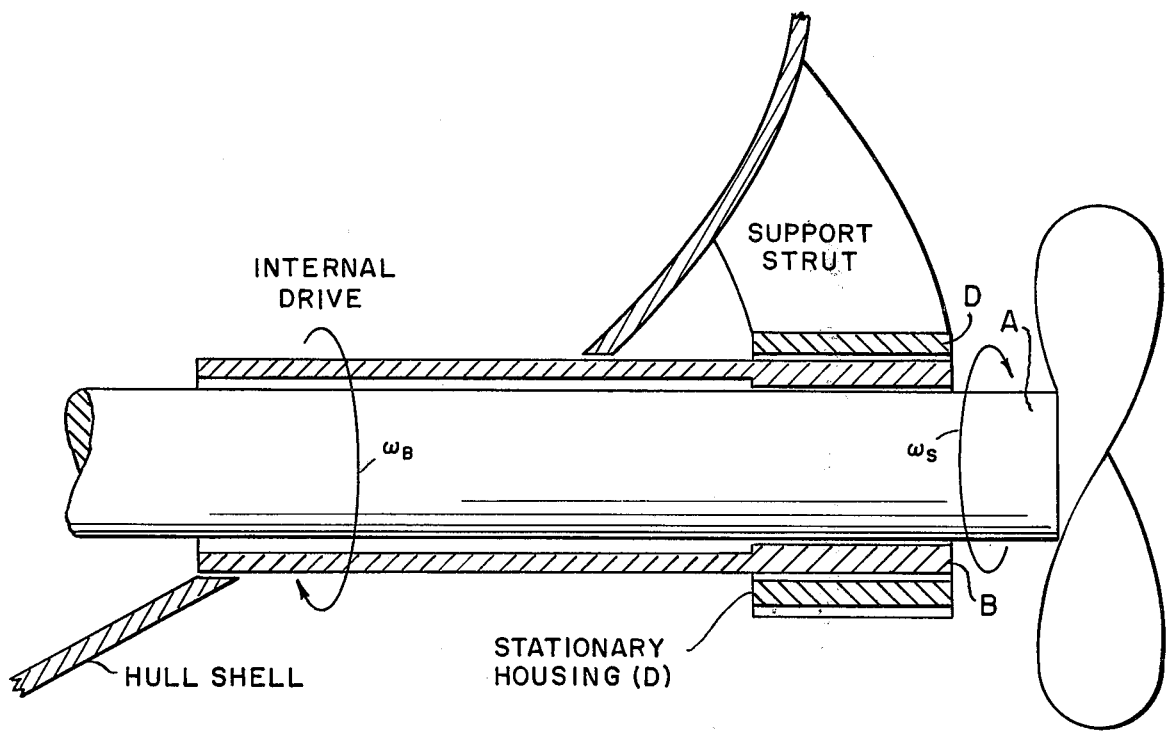
FIG. 5.

RUBBER STAVE BEARING WHICH WILL PERMIT SLOW SPEED MOTION WITHOUT STICK-SLIP AND RESULTANT SQUEAL

The invention described herein may be manufactured and used by or for the Government of the United States of America for Governmental purposes without the payment of any royalties thereon or therefor.

BACKGROUND OF THE INVENTION

The use of staves of rubber or other similar materials for bearings for stern tube bearing application has been satisfactory with the exception of slow speed motion which induces stick-slip phenomenon and resultant squealing sounds. The rubber stave bearings operate with sea water as a lubricant and coolant. The bearings are of hydrodynamic type, establishing a separating film of lubrication between the moving parts due to the motion. Attempts to use materials which do not exhibit as much of a stick-slip phenomenon as rubber have thus far been unsuccessful. Use of high density polyethylene has resulted in excessive wear rates. New submarines are being designed with slow speed propellers and shafting. This is expected to cause excessive sounds which are emitted directly into the water making it easy for detection by other ships.

The present invention provides a novel solution to the problem of stick-slip phenomenon by rotating a shell to which the shaft bearing assembly is attached in a direction opposite to the direction of rotation of the shaft or in the same direction at a faster rotational speed. This contrarotation action or increased relative speed aids in the development of hydrodynamic lubrication of the shaft.

STATEMENT OF THE OBJECTS OF THE INVENTION

Accordingly, it is a general object of this invention to provide a novel means for eliminating the problems of stick-slip phenomenon.

Other objects, advantages and novel features of the invention will become apparent from the following detailed description of the invention when considered in conjunction with the accompanying drawings wherein:

FIG. 1 is a cross section of the rotatable shaft, rotatable metal shell, bearing assembly and stationary housing;

FIG. 2 is a perspective view of a single stave;

FIG. 5 is a partial side view of the present invention showing the concept of extension of the rotatable shell through the ship hull;

DESCRIPTION OF THE PREFERRED EMBODIMENTS

Figure 3:
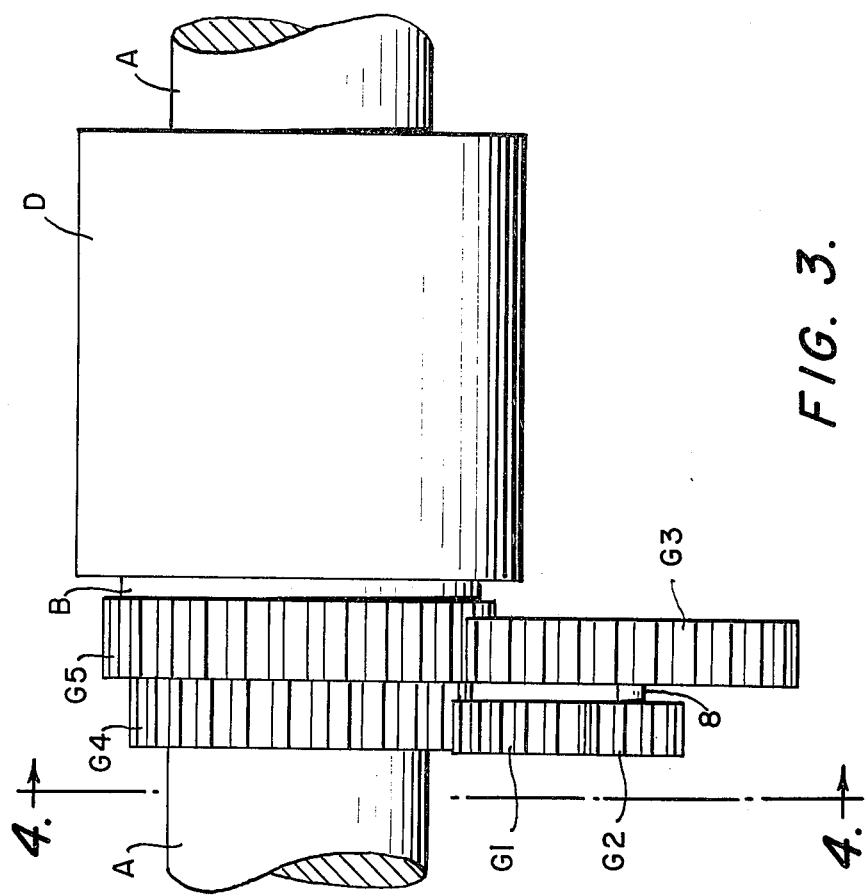
FIG. 3 is a side view of a gear drive mechanism for the rotatable shell.

The invention shown in FIG. 1 includes a rotatable metal shell B with conventional staves 10 attached to the inner periphery of B which encircles rotatable shaft A. A stationary housing D surrounds the rotatable metal shell B and also includes conventional staves 5. Stave bearings 5 and 10 are shown in perspective in FIG. 2 and, as is conventional, consist of an inner rubber surface 6 and an outer metallic surface 7 to which the rubber is attached. Obviously moreover, other types of bearing designs could be used to provide support of the shaft. The metal shell is rotated mechanically or electrically in a direction opposite to the direction of rotation of shaft A as is illustrated in detail in FIGS. 3,4,6,7, and 8. Alternatively, B may be rotated in the same direction as A but desirably at a higher rotational speed than that of A.

Figure 4:
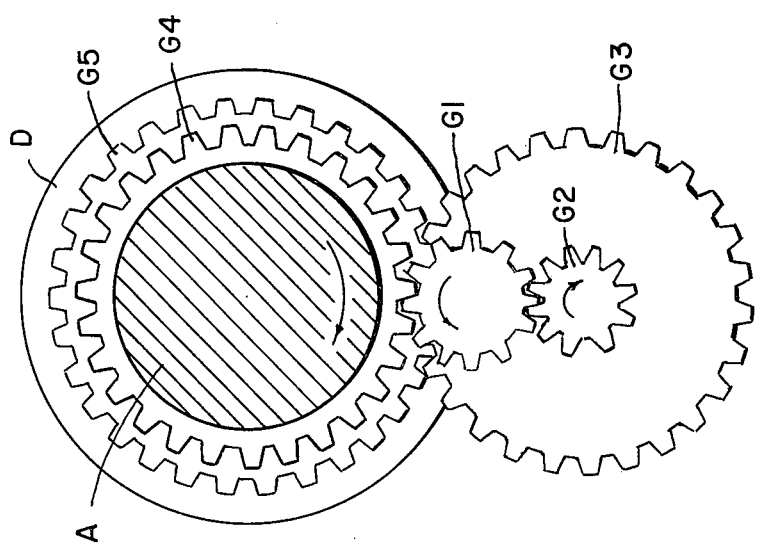
FIG. 4 is a cross section of the gear drive mechanism of FIG. 3 taken along the section 4-4.

FIGS. 3 and 4 illustrate one embodiment of the present invention wherein the rotatable shell B to which the stave bearing assembly is attached is rotated by mechanical means. Specifically, gear G1 meshes with gear G4 which is directly attached to shaft A. Gear G1 is forced to rotate in the direction indicated by the arrow on gear G1 by gear G4 mounted on the shaft A. Gear G1 also meshes with gear G2 which is connected by a suitable drive rod 8 to gear G3. Gear G3 meshes with gear G5 which is directly attached to the rotatable shell B. Thus, it is clearly seen that shaft A will rotate in a direction opposite to the direction of rotation of rotatable shell B and at a speed dependent upon the size of the gears used. Suitable gearing could alternatively be provided such that shell B is forced to rotate in the same direction as shaft A but at a higher rotational speed (not shown).

Figure 6:
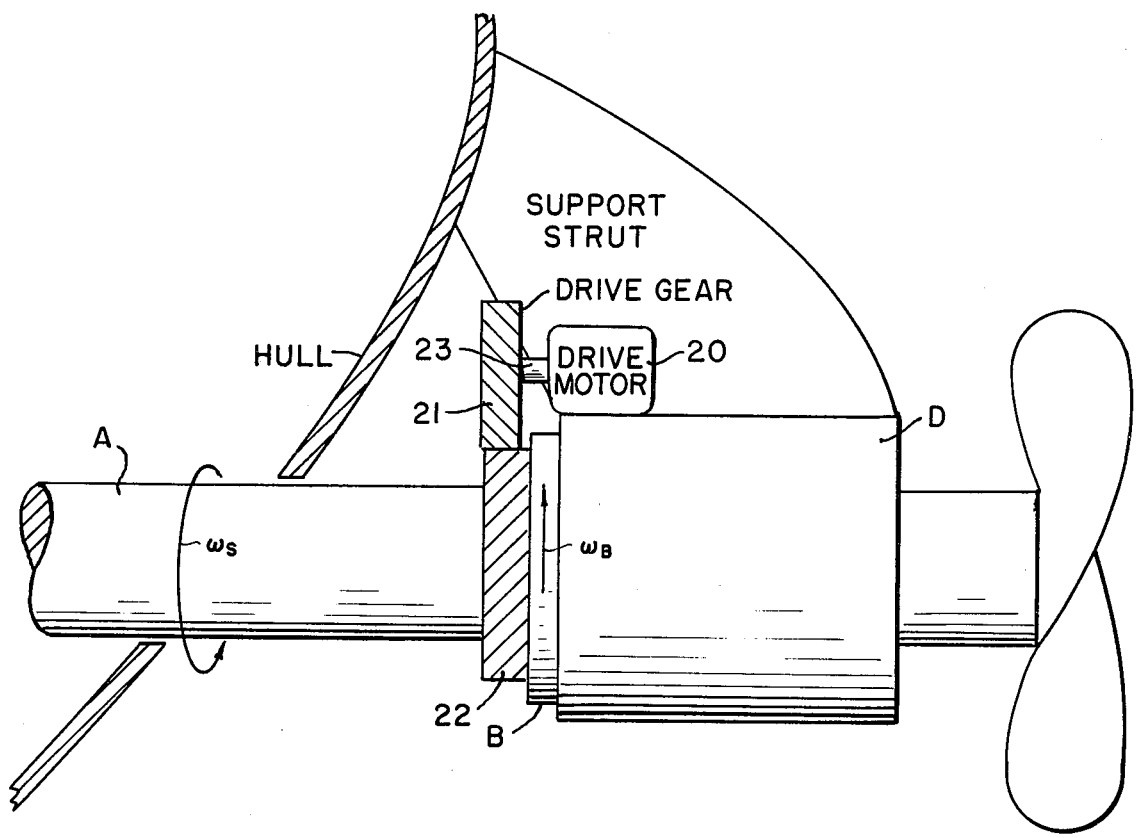
FIG. 6 is a side view of an alternative drive means for the rotatable shell.

FIG. 6 illustrates a second alternative drive means for rotating shell B. In FIG. 6 a drive motor 20 is mounted on stationary housing D and rotates drive gear 21 through shaft 23. Gear 21 meshes with gear 22 to which rotatable shell B is directly attached. Motor 20 is driven preferably in a direction such that B rotates in a direction opposite to the direction of rotation of shaft A as is indicated by the rotation arrows $\omega_s$ and $\omega_B$. Alternatively, motor 20 may drive gear 21 such that gear 22 and shell B rotate in the same direction as A but at a higher rotational speed than that of shaft A.

Figure 8:
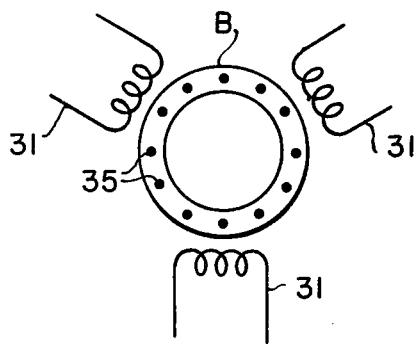
FIG. 8 is a partial cross section of the embodiment of FIG. 7.
Figure 7:
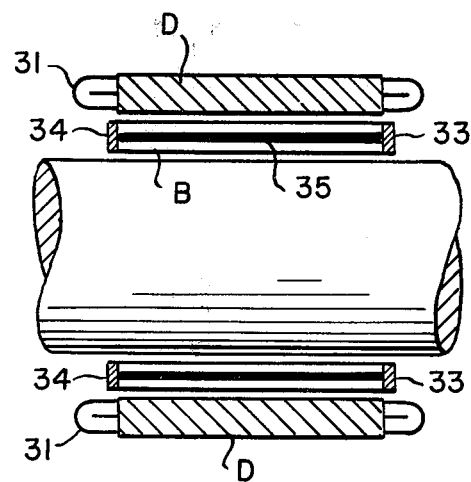
FIG. 7 is a side view of another drive means for the rotatable shell wherein the stationary housing serves as a stator core and the rotatable shell serves a rotor.

FIGS. 7 and 8 show another alternative embodiment utilizing a dynamo electric machine wherein stationary housing D is constructed as a stator core including end turn winding coils 31 and rotatable shell B is constructed as a rotor of a squirrel cage motor including end rings 33 and 34 connecting the implanted copper bars 35 as is conventional. Thus, energization of the stator windings 31 causes rotation of the rotatable shell B which by proper design will rotate preferably in a direction opposite to the direction of rotation of shaft A and at a preselected speed or alternatively in the same direction of rotation of shaft A but at a higher rotational speed.

FIG. 5 is another embodiment of the present invention wherein the rotatable shell B is extended through the ship's hull and is driven by suitable internal drive means such as those shown in FIGS. 3,4,6,7 and 8.

Thus, a novel shaft and bearing assembly has been disclosed which enables rotatable shafts to rotate at slow rotational speeds without causing stick-slip phenomenon and resulting squealing noises which makes easy the finding and tracking of vessels by sonar easy. By forcing rotation of the intermediate bearing assembly, increased relative speeds are created between the shaft and the bearing assembly and hydrodynamic lubrication is facilitated.

Obviously many modifications and variations of the present invention are possible in the light of the above teachings. It is, therefore, to be understood that within the scope of the appended claims the invention may be practiced otherwise than as specifically described.

What is claimed is:

1. A shaft and bearing assembly comprising:
   a rotatable shaft;
   a rotatable shell surrounding said shaft;
   a first bearing assembly attached to the interior of said shell and positioned in the space intermediate said shell and said shaft;
   a stationary bearing housing surrounding said shell;
   said housing having a second bearing assembly attached to the interior thereof, and intermediate said shell and said housing;
   means for rotating said shell and said bearing assembly attached thereto in a direction opposite the direction of rotation of said shaft; and
   means for hydrodynamic lubrication of said first and second bearing assemblies comprising a liquid in which said bearing is immersed under normal operating conditions.

2. The assembly of claim 1 wherein said bearings include rubber staves.

3. The assembly of claim 1 wherein said means for rotating said shell includes gear means operably interconnected to said shaft and to said shell, said gear means being driven by the rotation of said shaft.

4. The assembly of claim 1 wherein said means for rotating said shell includes a drive motor operably connected to said shell.

5. A shaft and bearing assembly comprising:
   a rotatable shaft;
   a rotatable shell surrounding said shaft and comprising a rotor of a dynamo-electric machine;
   a first bearing assembly attached to the interior of said shell;
   a stationary bearing housing surrounding said shell;
   said housing having a second bearing assembly comprising the stator of a dynamo-electric machine;
   energizing means operably coupled to said housing for forcing rotation of said shell and the bearing assembly, whereby the forced rotation of said shell increases the relative rotational speeds between said shaft and bearing assembly; and
   means for hydrodynamic lubrication of said first and second bearing assemblies comprising a liquid in which said bearing is immersed under normal operating conditions.

* * * * *